Figure 1:
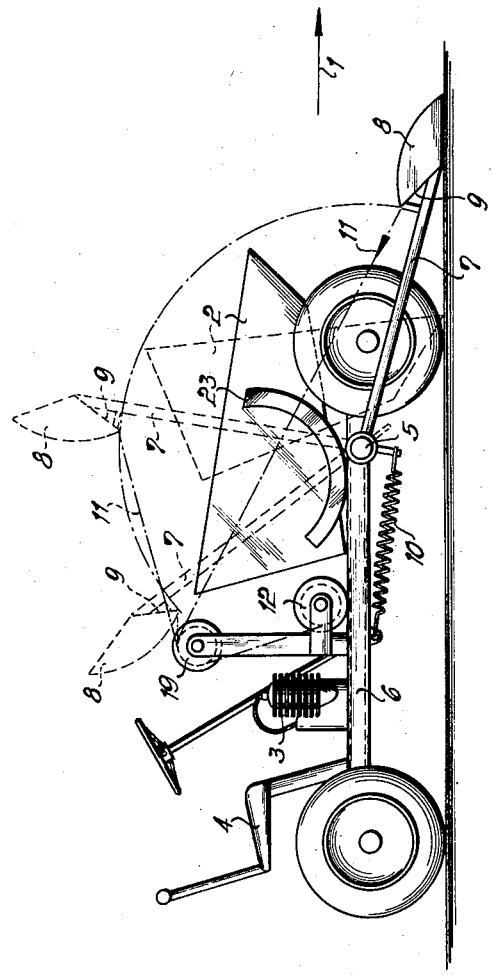

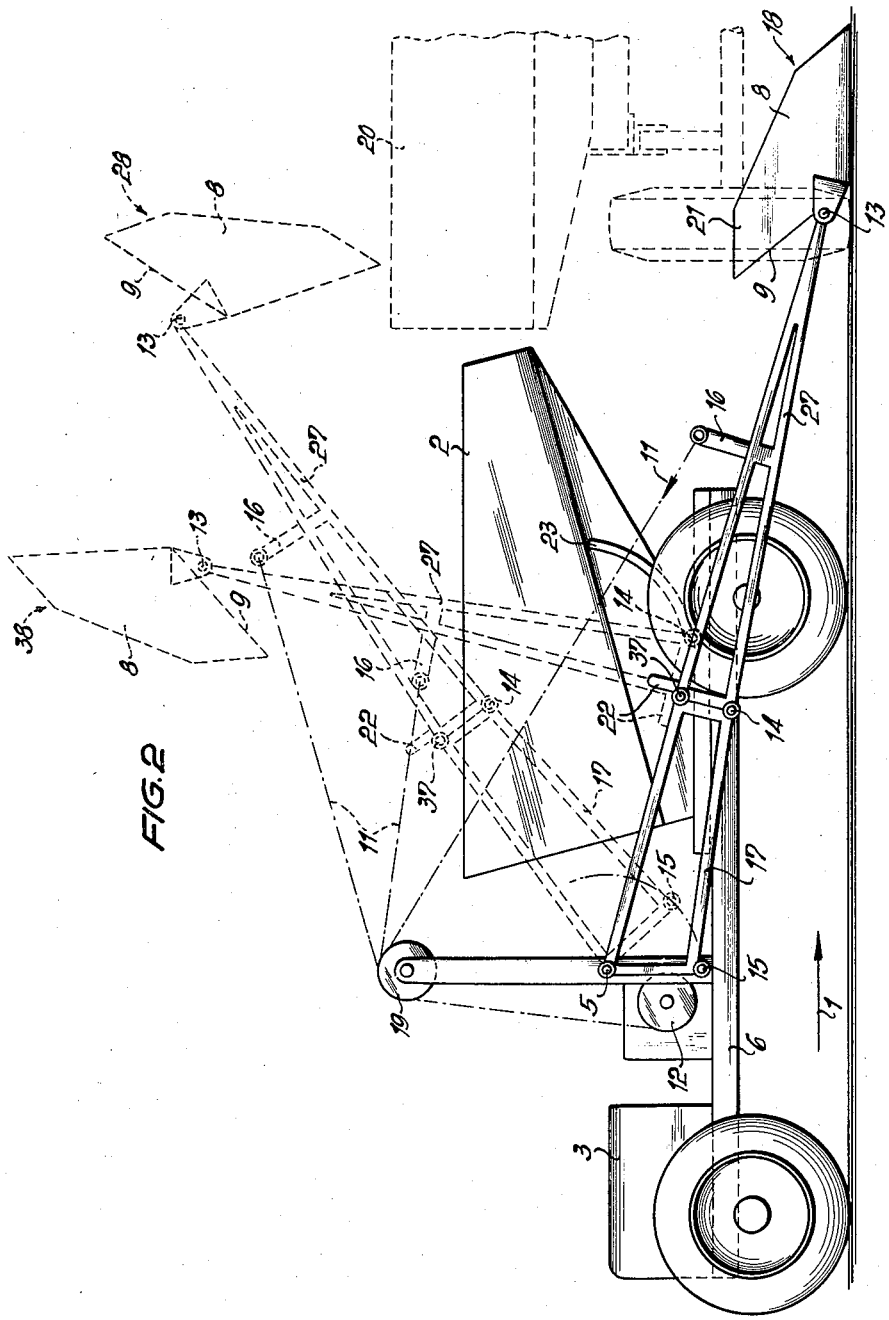

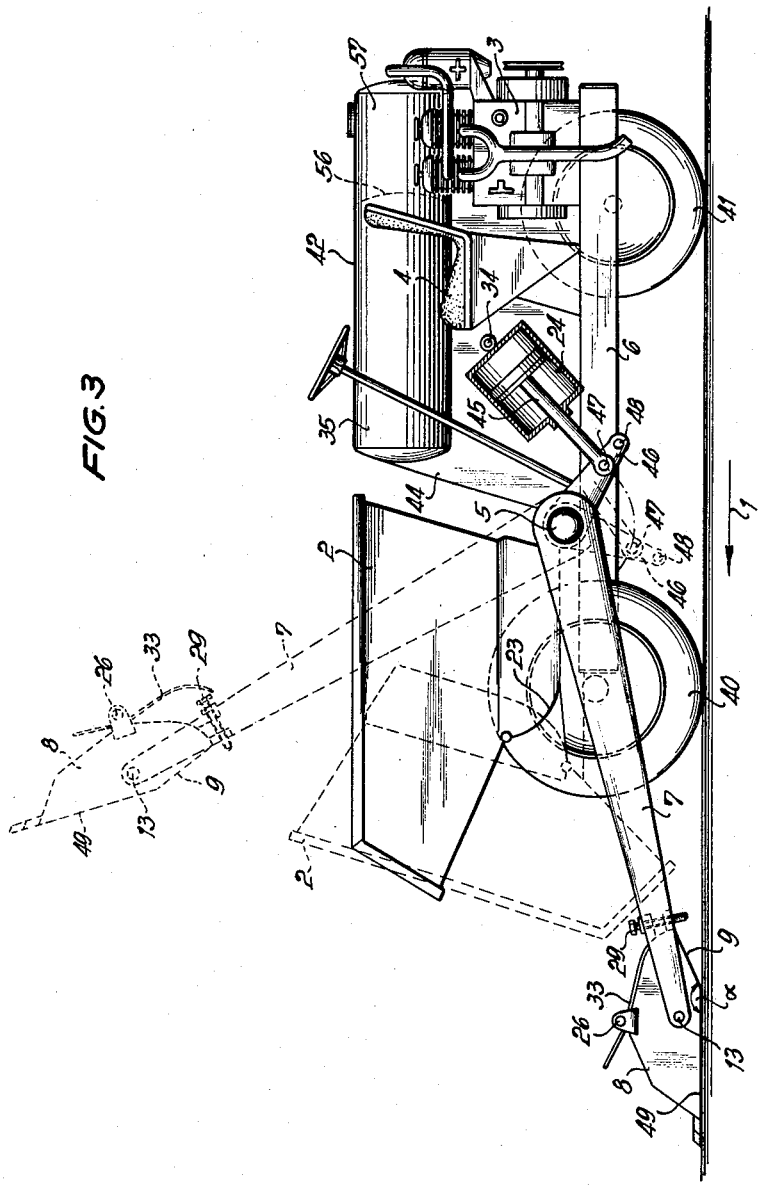

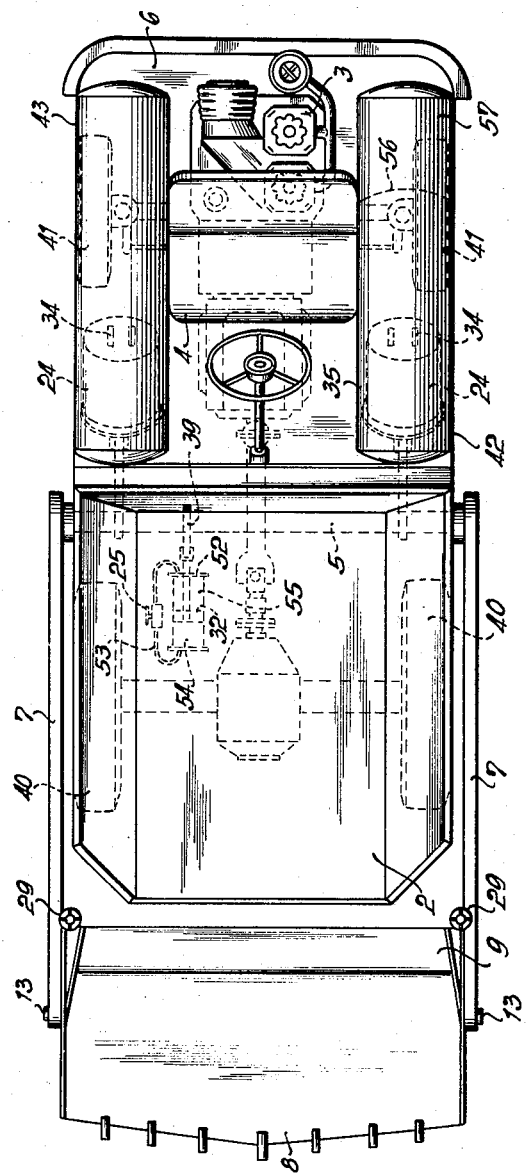

July 29, 1958  K. KLAUS  2,845,192
EXCAVATING AND SELF-LOADING DUMP TRUCK
Filed Nov. 15, 1955  5 Sheets-Sheet 5
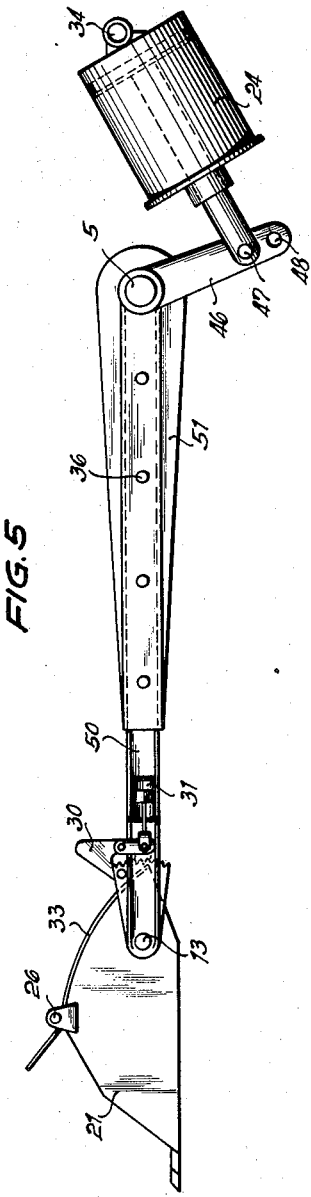
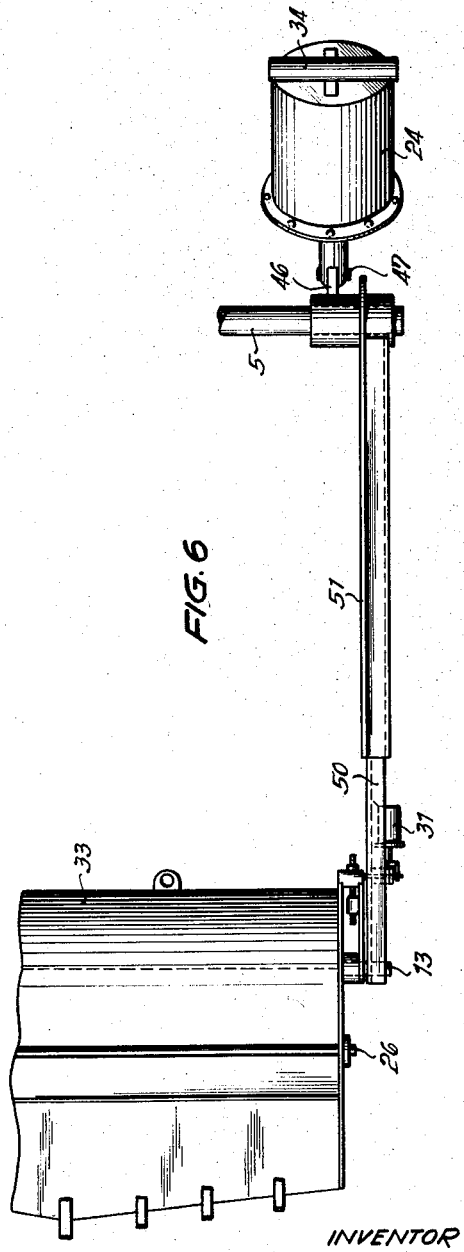
INVENTOR
K. Klaus
ATTYS.

United States Patent Office
2,845,192
Patented July 29, 1958

2,845,192

EXCAVATING AND SELF-LOADING DUMP TRUCK

Kaspar Klaus, Memmingen, Germany

Application November 15, 1955, Serial No. 555,222

Claims priority, application Germany November 16, 1954

15 Claims. (Cl. 214—78)

The invention comprises an excavating and dumping vehicle by which all working operations such as loading the shovel, loading the dump body and dumping the dump body are in the sight of the driver. A further feature of the invention consists in an arrangement whereby the shovel and the dump body do not interfere with each other i. e. that it is possible to dump the vehicle in any positions of the shovel.

A broad object of the invention is to provide a chassis of a vehicle which is constructed in a very simple manner.

Another object of the invention is to provide a dumping vehicle that can be used for loading other vehicles without the necessity of mounting thereon any additional parts.

A further and more distinct object of the invention is to provide a dumping vehicle having a motor driven chassis and a dump body pivotally mounted at the front end of the chassis; a pair of arms are mounted one on each side of the body and swingably secured to the chassis to support a pivotable shovel between them.

Several constructional examples of the invention are illustrated in the accompanying drawings, in which:

Fig. 1 shows the side elevation of a dumper according to the invention, the swivelling device of which is actuated by pulling a rope;

Fig. 2 the side elevation of another dumper with divided swivelling arms;

Fig. 3 a side elevation of another constructional example of the dumper according to the invention, in which the swivelling arrangement is operated by compressed air;

Fig. 4 a plan view of the constructional example according to Fig. 3;

Fig. 5 a detail of the dumper according to Figs. 3 and 4 and

Fig. 6 the plan view of the illustration according to Fig. 5.

By the arrow 1 the main travelling direction is indicated. At the forward end of the vehicle is arranged the loading material container 2 which can be tilted over forward at the front. Behind the container 2 are arranged the driving engine 3 and the driver's seat 4, so that the driver can see uninterruptedly over the container. Below the container 2 are mounted on the chassis 6 the swivelling arms 7 so as to be capable of swivelling about the swivelling shaft 5 in the vertical plane. At the free end of the swivelling arms 7 is mounted the shovel 8. After the swinging of the arms 7 out of the loading position for the shovel 8 on the ground into a, say vertical position, the shovel will empty itself owing to the angled surface 9 of the shovel back into the container 2. The fork can be swung back further beyond the vertical position towards the back into the backward end position, in which position the space above the container 2 is completely free for loading it by means of a grab or from a silo and for the removal of the container 2 by a crane. On the way from the vertical position to the extreme position the spring 10 is stressed, which, acting as a power accumulator, on its release returns the arms 7, until the arms with the shovel fall back due to their own weight into the initial position, on the rope pull 11 provided as driving means is released.

The dumper of Fig. 2 is constructed as a self driving vehicle with the driving engine 3.

The swivelling arrangement has on each side of the vehicle chassis swivelling arms 17, 27. At the end of these arms there is pivotally supported by pivots 13 the shovel 8. The pivotal joint can be locked in the position of the arms and the shovel 8, indicated by 18.

Each arm of the swivelling arrangement consists of two part arms 17 and 27. The two part arms are pivotally connected with one another by a pivotal joint 37. The part arm 27 supports the shovel 8 and the part arm 17 is connected by the pivotal joint 5 with the chassis 6. 14 represents locking means for the joint 37 between the two part arms and 15 locking means for the joint 5 between the swivelling arm 17, 27 and the chassis 6.

At an outrigger 16 which is arranged about in the middle of the part arm 27 the rope 11 engages at 17, which passes over the pulley 19, placed as high as possible, and then leads to a winch 12. Through the outrigger 16 and the high position of the rope deflecting pulley 19 as favourable as possible a direction of application of the pull of the rope 11 is obtained.

For loading a container 20, for instance of another vehicle, the locking means 15 for the joint 5 is released, whilst the locking means 14 remains in the locking position. By winding the rope on to the rope drum 12 the whole arrangement 17, 27 and 8 swings into the position for the shovel 8 indicated by 28. Through unlocking the shovel pivots 13, the shovel tilts forward and empty itself into the container 20. On the fork sinking downwards again, the shovel 8 tilts back into the loading position, for instance also in consequence of the corresponding arrangement of the centre of gravity of the empty shovel.

When the container 2 mounted on the vehicle itself is to be loaded, the pivot 5 at 15 is locked and the pivot 37 at 14 unlocked. Through a pull on the rope the part arm 27 will buckle with respect to the held part arm 17 inwards and will move into the position 38 of the shovel 8, the pivot of which has remained locked, empty itself backward. The side walls 21 of the shovel 8 are, for preventing the loading material from scattering, bent inwards in the region of the rear surface 9, so that a kind of discharge funnel is formed. The swinging motion of the part arm 27 with respect to the part arm 17 is limited by a stop 22 provided on the part arm 27. The container 2 is formed as a tilting container designed to empty towards the front of the vehicle. Through the provision of a rolling arc 23 this container is constructed as a self tilting container.

The loading material container 2 in the constructional example of Figs. 3 and 4 rests at the forward front end of the vehicle on the chassis 6 above the front wheels 40, which are the driving wheels. In the rear part of the vehicle there are arranged in the region above the rear wheels 41, in this case non-driven steering wheels, one behind the other the driver's seat 4 and the engine 3, the engine overhanging rearwardly the axle on the rear wheels 41. The connection of the engine 3 with the driven wheels 40 is established by means of the known transmission means, such as coupling, gearing and, for instance, Cardan shaft. It is of advantage, however, to provide for the protection of the gearing a reversing coupling which allows of alternate forward and backward drive without gear shift.

To both sides of the driver's seat and the engine are arranged longitudinally the air storage containers 42 and 43. The weight of these parts forms a counterpoise to the weight of the parts projecting forwards over the axle of the front wheels 40, namely the shovel 8 the part lengths of the swivelling arms 7 and the forward part of the container 2.

To the outer and inner edges of the air storage containers 42 and 43 are welded cover sheets 44, the lower edges of which are connected to the chassis 6. These parts form, together with the bottom sheet under the driver's seat 4 and any transverse girders, a stiff supporting framework which is U-shaped in cross-section and the flange parts of which (formed by the cover sheets) form a hollow profile, in which may be mounted transverse bulkheads.

The swivelling arms 7, at the forward ends of which the shovel 8 is supported, have their centre of rotation in the range of the rear edge of the container 2. Both swivelling arms are fixed on the rocking shaft 5, which expands right across. The pneumatically driven working cylinders of the examples shown in Figs. 3 to 6 for the swivelling arms 7 are pivoted on pins 34 and are housed in the hollow space formed by the cover sheets 44 below the air storage containers 42 and 43 respectively. The piston rods 45 act on the lever arms 46 which are either fixed on the rocking shaft 5 or form extension of the swivelling arms 7. On the lever arms 46 are two points of application 47 and 48, to which the piston rods 45 can be selectively attached, either for loading the vehicle itself to the points of application 47 and, for loading other vehicles, to the points of application 48 lying further from the rocking shaft 5.

The shovel 8 has a bottom surface 49 and a back surface 9, which form a very great obtuse angle α with one another which in accordance with the length of the swivelling arms 7 and with regard to the arrangement of the container 2 is so selected that, when loading the vehicle itself, the shovelled material will with certainty slide down over the back surface 9 of the shovel, when the fork is at an angle of 80°. The protective cover 33 is supported at 26 and protects the driver from possible injury.

The shovel 8 is supported so as to be capable of rocking about the pivots 13 within a range of about ±10° around a central position and is secured in its adjusted position by the screw spindle 29. The forward edge of the shovel may, as shown in Fig. 4, be provided with cutting teeth and have the form of a triangular edge or be rounded.

In the constructional form of shovel and swivelling arms according to Figs. 5 and 6, for selective use for loading the vehicle itself or another vehicle, the swivelling arms are composed of two part pieces 50 and 51 which telescope into one another. The length of arm is fixed by push-in pins 36 or the like. The shovel is provided with a protective cover 33 which at its forward edge is supported so as to be capable of rocking in pivots 26 in the upwardly extended side walls 21 of the shovel. The shovel is supported in the swivelling arms so as to be capable of being tilted downwards with its forward edge about the pivots 13. By means of the latch 30 the shovel is held in the loading position. For releasing the latch 30 the compressed air cylinder 31, is provided the supply pipe of which, extending in the longitudinally variable swivelling arms 50 and 51 is formed as a telescopic tube with sleeve packing between the two lengths of tube.

On the rockable shaft 5 is fixed a lever 39, to the end of which the piston rod of the piston 32 is attached, which works in the fluid cylinder 52. The piston motion caused by the rotation of the rockable shaft forces the fluid to circulate by way of the pipe 53 from the chamber 54 to the chamber 55 and vice versa. By adjusting the valve 25 the cross sectional area of circulation can be altered or blocked, which causes the swivelling arms to be fixed in their momentary position.

In the air storage container 42 is a transverse partition 56. The second 57 of the container serves the purpose of fuel container. The remaining space 58 is connected as working air container directly to the air producer and, by way of the operating valve for the swivelling arms (not shown), to the working cylinder 24. The other air storage container 43 is connected by way of an overflow valve (also not shown) with return flow means parallel to the working air container 58 and acts as a reverse air container.

Under the weight of the loaded material the container 2 tilts after the release of arresting means, for instance pneumatically operated, automatically owing to the overhanging of the forward part. The return of the container may be effected by means of a special returning arrangement. It is preferable however so to position the centre of gravity of the empty container, through suitable shaping that the container tilt back automatically.

For accelerating the lower end of the swivelling arms each working cylinder is provided with a quick release valve. The working cylinder 24 is provided with a bearing 34 which supports a bearing shaft (not shown) which extends right across. The bearing shaft is supported in the cover sheets 44. For supporting the bearings an eccentric disc is rigidly connected with the bearing shaft at each bearing place. The bearing shaft is turned by means of a lever (not shown). By this means the centre of rotation of the working cylinders is displaced and the shovel enters more or less deeply into the soil, according to the position of the eccentric discs.

The dumper according to the invention may be provided in place of the shovel with a levelling or snow shifting shield, so as to be able to use the vehicle for other purposes.

What I claim is:

1. A loading and dumping vehicle comprising in combination a motor driven chassis, a dump body pivotally secured at the front end of said chassis and tiltable forwardly, a pair of swingable arms rotatably secured at a first end thereof directly to said chassis one on each side of said body, power means to swing the other end of said arms through a predetermined path, a shovel mounted between said pair of arms at the said other end and arranged to be turned in front and above the said body, the said arms formed to be of such length as to permit forward pivoting of said body in all shovel positions in the predetermined path.

2. The invention as set forth in claim 1 wherein the said pair of swingable arms are rotatably secured to said chassis on a line under the rearward end of said dump body when the body is in loading position on the chassis.

3. The invention as set forth in claim 1 wherein said pair of swingable arms are rotatably secured to the said chassis on a line behind the rearward end of the dump body when the body is in loading position on the chassis.

4. The invention as set forth in claim 1 wherein the said arms are formed to be of such length that said shovel moves in front of said body on a first portion of the predetermined path, and means turnably mounting said shovel to said arms to permit shovel tilting in a front direction.

5. The invention as set forth in claim 1 wherein the said shovel is movable from a position over the dump body to a rearward position behind the dump body.

6. The invention as set forth in claim 4 wherein the said arms are formed to be variable in length whereby when said arms are relatively short said shovel can be tilted over said dump body to load the same and when said arms are relatively long said shovel can make substantially vertical movements only to load an external container.

7. The invention as set forth in claim 6 wherein said arms each comprise two portions, a first portion rotatably mounted on said chassis, means to selectively lock the rotatable mounting, selectively lockable junction means between said two portions, said shovel carried by the second arm portions, and a rope pull secured to the second arm portions.

8. The invention as set forth in claim 1 wherein the said power means comprises compressed air cylinders.

9. The invention as set forth in claim 8 including longitudinally arranged air storage cylinders fixed to said chassis.

10. The invention as set forth in claim 8 wherein the piston rods of said cylinders are selectively connectable to either of two points of said arms, the two points being of different distances from the axis of rotation of said arms so that with the same piston stroke the shovel is either swung above the body or performs a substantially vertical motion.

11. The invention as set forth in claim 8 wherein said arms are fixed on a rockable shaft common thereto.

12. The invention as set forth in claim 8 including means to transmit the motion of said arms to a piston disposed in a fluid containing cylinder, means to permit fluid circulation between a forward and rear piston chamber, and a valve to selectively vary the fluid circulation.

13. The invention as set forth in claim 1 including means mounting said shovel to said arms to vary the angle formed between said shovel and said arms.

14. The invention as set forth in claim 6 wherein said arms each comprise two portions, a first portion rotatably mounted on said chassis, means to selectively lock the rotatable mounting, and selectively lockable junction means between said two portions, said shovel carried by the second arm portions.

15. The invention as set forth in claim 14 including a power means secured to the second arm portions.

References Cited in the file of this patent

UNITED STATES PATENTS

| | | |
|---|---|---|
| 1,488,267 | Meyers | Mar. 25, 1924 |
| 1,670,773 | Lemp | May 22, 1928 |
| 1,703,600 | Sell | Feb. 26, 1929 |
| 1,932,698 | Jose | Oct. 31, 1933 |
| 2,170,932 | Venema | Aug. 29, 1939 |
| 2,392,025 | Craig | Jan. 1, 1946 |
| 2,441,591 | Owen | May 18, 1948 |
| 2,624,478 | Kaplan | Jan. 6, 1953 |
| 2,643,011 | Brisson et al. | June 23, 1953 |
| 2,652,936 | Hensley | Sept. 22, 1953 |
| 2,712,876 | Kuehn | July 12, 1955 |
| 2,754,020 | Dunn et al. | July 10, 1956 |
| 2,776,769 | McDonald | Jan. 8, 1957 |

FOREIGN PATENTS

| | | |
|---|---|---|
| 1,088,185 | France | Sept. 8, 1954 |